United States Patent
Wikström et al.

(10) Patent No.: US 10,306,674 B2
(45) Date of Patent: May 28, 2019

(54) NODE AND METHOD FOR DETERMINING CCAT IN WLAN

(71) Applicant: Telefonaktiebolaget LM Ericsson, Stockholm (SE)

(72) Inventors: Gustav Wikström, Täby (SE); Johan Söder, Stockholm (SE); Anders Furuskär, Stockholm (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 15/519,916

(22) PCT Filed: May 29, 2015

(86) PCT No.: PCT/SE2015/050623
§ 371 (c)(1),
(2) Date: Apr. 18, 2017

(87) PCT Pub. No.: WO2016/068772
PCT Pub. Date: May 6, 2016

(65) Prior Publication Data
US 2018/0302925 A1    Oct. 18, 2018

Related U.S. Application Data

(60) Provisional application No. 62/073,050, filed on Oct. 31, 2014.

(51) Int. Cl.
*H04L 12/28* (2006.01)
*H04W 74/08* (2009.01)
(Continued)

(52) U.S. Cl.
CPC ............ *H04W 74/0808* (2013.01); *H04L 1/00* (2013.01); *H04W 74/08* (2013.01); *H04W 84/12* (2013.01)

(58) Field of Classification Search
USPC ................................. 370/252, 329, 278, 445
See application file for complete search history.

(56) References Cited

U.S. PATENT DOCUMENTS

2007/0286122 A1    12/2007  Fonseca
2008/0008133 A1    1/2008   Zhu et al.
(Continued)

FOREIGN PATENT DOCUMENTS

EP    2 775 776 A1    9/2014
EP    3 162 153       5/2017
(Continued)

OTHER PUBLICATIONS

Communication regarding the European Search Report for European Patent Application No. 15853979.1 (dated Oct. 5, 2017).
(Continued)

*Primary Examiner* — John Pezzlo
(74) *Attorney, Agent, or Firm* — Sage Patent Group

(57) ABSTRACT

A first node and a method performed by the first node for determining a Clear Channel Assessment Threshold, CCAT, with regards to a second node operable in the WLAN are provided. The method performed by the first node comprises performing a transmission to the second node using a Modulation and Coding Scheme, MCS, and determining the CCAT based on the MCS used for the transmission.

24 Claims, 4 Drawing Sheets

(51) Int. Cl.
H04L 1/00 (2006.01)
*H04J 1/16* (2006.01)
*H04W 84/12* (2009.01)

(56) References Cited

U.S. PATENT DOCUMENTS

2015/0245358 A1* 8/2015 Schmidt .............. H04L 43/0888
370/329
2016/0088618 A1* 3/2016 Barriac ............ H04W 74/0816
370/329
2016/0345363 A1* 11/2016 Ni ........................ H04W 74/08

FOREIGN PATENT DOCUMENTS

WO  WO 2007/027442 A2  3/2007
WO  WO 2015/199593 A1  12/2015

OTHER PUBLICATIONS

International Search Report and Written Opinion of the International Searching Authority for International Application No. PCT/SE2015/050623 (dated Jan. 25, 2016).
Novelty Search Report, PRV InterPat, Swedish Patent Office (dated Nov. 26, 2014).

* cited by examiner

NODE AND METHOD FOR DETERMINING CCAT IN WLAN

CROSS REFERENCE TO RELATED APPLICATIONS

This application is a 35 U.S.C. § 371 national stage application of PCT International Application No. PCT/SE2015/050623, filed on May 29, 2015, which itself claims priority to U.S. Provisional Application No. 62/073,050 filed Oct. 31, 2014, the disclosure and content of both of which are incorporated herein by reference in their entireties.

TECHNICAL FIELD

The present disclosure relates to Wireless Local Area Networks, WLANs, and in particular to determining a Clear Channel Assessment Threshold, CCAT, in a node operable in a WLAN.

BACKGROUND

In WLANs, a CCAT is specified to define a threshold for received signal strength above which a WLAN node, e.g. an Access Point, AP, or a wireless device, STA, will sense the transmission of other WLAN devices to avoid transmission collision.

Generally, one CCAT may be defined for all the nodes in the system regardless of the location and radio condition of each individual node; or every node may determine the CCAT independently of other nodes. A default value, e.g. −82 dBm, may be defined that the nodes may use. This may not be optimal in all different situations since the CCAT may be optimised based on the local condition of each wireless device in order to improve both user experience and system efficiency.

When a node wishes to perform a transmission, the node senses the channel, this is often referred to as listens to the channel. The procedure is sometimes referred to as Listen-Before-Talk. The node may receive signals and/or transmissions from other nodes in the LAN, wherein the node receives a certain received power. The node may then compare the received power to the CCAT, and if the received power is above the CCAT, the node concludes that the channel is busy and refrains, or backs off, from transmitting on the channel. If the received power is below the CCAT, the node concludes that the channel is free and may initiate a transmission to another node.

A threshold for the wireless devices based on received power from their AP has been proposed to be used in order for the wireless devices to determine whether a channel is free or busy. However, this may not be optimal from a performance perspective, since it does not include any information about the interference situation of the wireless device. In other words, nodes in the network may be prevented from transmitting even though the transmission is likely to be successful and not disturb other ongoing transmissions.

Yet another solution has been proposed, e.g. in EP2775776, where the CCAT is determined based on previous receptions of packets.

SUMMARY

The object is to obviate at least some of the problems outlined above. In particular, it is an object to provide a first node and a method performed by a first node for determining a CCAT with regards to a second node. These objects and others may be obtained by providing a first node and a method performed by a first node according to the independent claims attached below.

According to an aspect, a method performed by a first node for determining a CCAT with regards to a second node is provided. The first node and the second node are operable in a WLAN. The method comprises performing a transmission to the second node using a Modulation and Coding Scheme, MCS, $MCS_n$, and determining the CCAT based on the $MCS_n$ used for the transmission.

According to an aspect, a first node for determining a CCAT with regards to a second node is provided. The first node and the second node are operable in a WLAN. The first node is configured for performing a transmission to the second node using a Modulation and Coding Scheme, MCS, $MCS_n$, and determining the CCAT based on the $MCS_n$ used for the transmission.

The first node and the method performed by the first node may have several possible advantages. One possible advantage is that air efficiency may be improved since the CCAT may be determined dynamically with respect to current channel conditions and situations. Another possible advantage is that user experience may be improved since the dynamically adjusted or determined CCAT may enable transmissions when the channel conditions and situations are favourable and thus increase channel reuse, and also hinder transmissions when the channel conditions and situations are unfavourable and thus preventing packet loss and retransmissions.

BRIEF DESCRIPTION OF DRAWINGS

Embodiments will now be described in more detail in relation to the accompanying drawings, in which.

DETAILED DESCRIPTION

In Institute of Electrical and Electronics Engineers, IEEE, Wi-Fi (also known as WLAN and these terms will be used interchangeably throughout this document) is standardised in the 802.11 specifications (IEEE Standard for Information technology—Tele-communications and information exchange between systems, Local and metropolitan area networks—Specific requirements, Part 11: Wireless LAN Medium Access Control (MAC) and Physical Layer (PHY) Specifications). Wi-Fi is a technology that currently mainly operates on the 2.4 GHz or the 5 GHz band. The IEEE 802.11 specifications regulate the STA (access points or wireless terminals) physical layer, MAC layer and other aspects to secure compatibility and inter-operability between access points and portable terminals, (here from referred to as wireless device). Wi-Fi is generally operated in unlicensed bands, and as such, communication over Wi-Fi may be subject to interference sources from any number of both known and unknown devices. Wi-Fi is commonly used as wireless extensions to fixed broadband access, e.g., in domestic environments and hotspots, like airports, train stations and restaurants.

A wireless device may be a mobile phone, a User Equipment, UE, a Personal Digital Assistant, PDA, a laptop, a machine or device such a vending machine, or any other arrangement (e.g. a vehicle) comprising communication means by means of which the arrangement is enables to communicate with an AP or another wireless device by means of the Wi-Fi. The situation where two wireless devices communicate directly is sometimes referred to WiFi Direct.

The Modulation and Coding Scheme, MCS, index is an index describing the modulation type, code rate and number of streams used in a transmission. The MCS index starts at 0, corresponding to the lowest link bitrate, and for a 20 MHz channel with up to 256QAM modulation it goes up to 9 for 1 spatial stream transmissions. For multiple stream transmissions the MCS can be extended to 10-19 for 2 streams, 20-29 for 3 streams etc. The higher the MCS, the more sensitive the transmission is to interference, but the transmission will carry a higher amount of data. The MCS is selected by a process, or an algorithm, commonly referred to as the rate adaptation, sometimes also called link adaptation. This is typically a proprietary implemented algorithm that may use available knowledge of interference situation, achieved through e.g. historical data on failure rates for transmissions with different MCS's, or explicit feedback from the transmitter.

Figure 1:
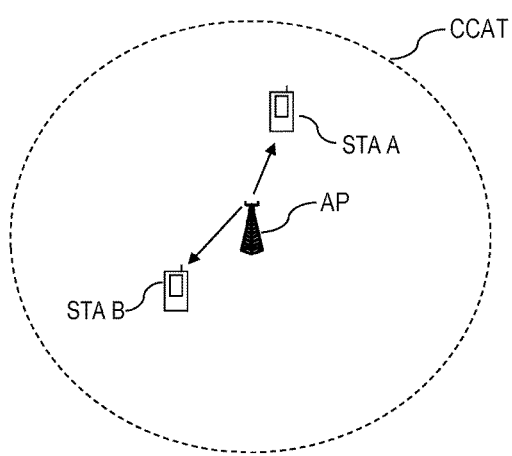
FIG. 1 is an illustration of an implication of a certain CCAT for an AP.

The WLAN technology relies on Carrier Sensing Multiple Access with Collision Avoidance, CSMA/CA, in order to effectively and fairly share the wireless medium among different WLAN entities and even different Radio Access Technologies, RATs. CSMA/CA applied by the WLAN system demands that every device that wishes to send data senses the common communication channel before carrying a transmission in order to avoid simultaneous transmissions, which potentially would result in loss of data and need of retransmissions. In order for a device to deem the channel busy, it has to detect a transmission, the received signal strength level of which surpasses a pre-determined power threshold, referred to as the CCAT. An example of an implication of a certain CCAT for an AP is depicted in FIG. 1. The AP may, in this simplified example, receive signal powers above the CCAT from all nodes within the circle, and consequently refrain from simultaneous transmission with those nodes.

Generally, one common CCAT is defined for all nodes, to be used when performing channel sensing for transmission to and from any node in the network.

By using only one value in the wireless device (STA or AP) for the CCAT, a node can be prevented from transmitting even if the transmission is likely to be successful and unlikely to disturb any ongoing transmissions. This may therefore not be an efficient use of the available spectrum in all situations.

Two tasks should be fulfilled through the setting of CCAT. The first is to make sure that the intended transmission is received with acceptable Signal to Noise and Interference Ratio, SINR. The second is that ongoing transmissions should not be harmed.

If the CCAT is set too low the node will defer from transmitting even when it is likely that the transmission may be successful and not disrupt or harm any ongoing transmissions. However, increasing the threshold makes the transmission more vulnerable for interference, which not all links may be able to survive. Therefore, the thresholds should be set for every link individually, and the level should adapt to the link quality. Also, increasing the threshold may create interference towards other links. Therefore, the threshold should be set in such a way that as few other transmissions as possible are interfered, or are interfered only to a certain degree.

Several methods have been proposed to adjust the CCAT based on received signal strength, RSS, path loss, target bitrate, etc. However, these methods either depend on average link quality measures or perform gradual adjustment based on a predefined target. None of them can act upon the SINR at the nodes. A solution in this disclosure proposes the use of different CCA thresholds, CCATs, depending on either the MCS of the latest received transmission, or the latest used MCS when transmitting, or a combination thereof. In another embodiment a (filtered) combination of several previously received or used MCSs may be used in various ways.

Embodiments herein relate to a method performed by a first node for determining a CCAT with regards to a second node. The first node and the second node are operable in a WLAN. The method will be described with reference to FIG. 2, which is a flowchart of the method performed by the first node.

Figure 2:
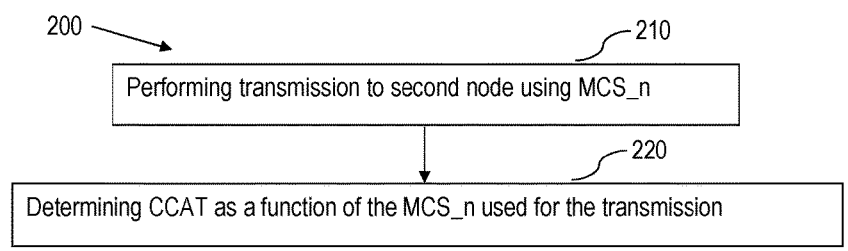
FIG. 2 is a flowchart of a method performed by a first node for determining a CCAT with regards to a second node according to an exemplifying embodiment.

FIG. 2 illustrates the method 200 comprising performing 210 a transmission to the second node using a Modulation and Coding Scheme, MCS, $MCS_n$, and determining 220 the CCAT based on the $MCS_n$ used for the transmission.

The MCS is related to the SINR since a relatively high SINR means that the channel quality is relatively good with relatively low interference. Since the interference is relatively low and the channel quality is relatively good, the code rate of the data to be transmitted on the channel may be relatively high and the modulation relatively high resulting in high data rate, thus the amount of data in the transmission may be relatively large. Thus the MCS may be relatively high. On the other hand, if the SINR is relatively low, then the channel quality is relatively bad with relatively high interference. Since the interference is relatively high and the channel quality is relatively bad, the code rate of the data to be transmitted on the channel may be relatively low and the modulation relatively low in order for the transmission to be successfully received by the receiver and the amount of data in the transmission may be relatively small. Thus the MCS may be relatively low.

The first node performs the transmission to the second node using the Modulation and Coding Scheme, $MCS_n$. The $MCS_n$ used in the communication with the second node may have been determined based on previous used MCSs, or it may be a start value, or some other information may have been used to determine the $MCS_n$ used. The first node may previously have communicated with the second node using respective MCSs, or the first node performs a first communication with the second node.

Especially if the first node has performed several previous communications, each previous communication has used a previous MCS. Thus, the $MCS_n$ may be reflective of previous channel conditions and situations, wherein the $MCS_n$ may be the same as one of the previous MCSs or higher or lower. Since most of the wireless devices in the WLAN generally move about, the channel conditions and situations may change over time, rapidly or slowly. The $MCS_n$ used may be determined based on previous used MCSs as will be described in more detail below. Consequently, since the channel conditions and situations may change over time, the CCAT may need to be changed accordingly in order to keep up with the current channel conditions and situations. In order to do so, the first node determines the CCAT based on the $MCS_n$ used for the transmission. It might be that there is no previous MCS if the performed communication between the first and the second node is the first to take place, wherein a start value for MCS may be used. If so, the CCAT may be determined as a function of only the $MCS_n$ being the start value which may be the only MCS available in such a case.

The MCS may be comprised in a preamble or header of a communication between the first and the second node and is therefore accessible in both the first and the second node after a communication has taken place.

The method performed by the first node may have several possible advantages. One possible advantage is that air efficiency may be improved since the CCAT may be determined dynamically with respect to current channel conditions and situations. Another possible advantage is that user experience may be improved since the dynamically adjusted or determined CCAT may enable transmissions when the channel conditions and situations are favourable and hinder transmissions when the channel conditions and situations are unfavourable and thus preventing possible collisions and retransmissions.

Determining 220 the CCAT may further be based on previously used MCS(s) for transmission(s) from the first node to the second node.

If there have been previous communications performed between the first and the second node, then the CCAT may be determined as a function of the $MCS_n$ and possible previously used MCS for transmission(s) from the first node to the second node. Thus, the first node may determine the CCAT as a function of the $MCS_n$ and possible previously used MCS for transmission(s) from the first node to the second node.

Determining 220 the CCAT may further be based on the $MCS_n$ and previously used MCS(s) for reception(s) by the first node of transmission(s) from the second node.

The MCS(s) used for reception(s) by the first node of transmission(s) is an indication of the interference that is "generated" or caused by transmissions from the first node. The MCS(s) used for transmission(s) by the first node of transmission(s) is related to the probability that the transmission from the first node may be correctly received (and decoded and/or demodulated). Thus, generally, from the perspective of the first node, probability that the transmission from the first node may be correctly received (and decoded and/or demodulated) may be a priority; and from the network perspective, it may be equally important that transmissions from the first node do not cause too much interference to other nodes and/or devices in the network. Consequently, by considering both MCS(s) used for transmission(s) by the first node of transmission(s) and MCS(s) used for reception(s) by the first node of transmission(s) when determining the CCAT, the CCAT may be optimal, or a good compromise, in order to increase the probability that the transmission from the first node may be correctly received (and decoded and/or demodulated) while not causing too much interference to other nodes and/or devices in the network.

The first node may be a wireless device and the second node may be an AP; or the first node may be an AP and the second node may be a wireless device. Further, both the first and the second node may be wireless devices, wherein the first and the second wireless devices communicate with each other without involving an AP.

Transmissions from the wireless device to the AP are generally referred to as uplink transmissions; and transmissions from the AP to the wireless device are generally referred to as downlink transmissions. From the AP point of view, when being the first node, the AP performs the method per wireless device. In other words, since the AP may communicate with a plurality of different wireless device located in various different locations within the coverage area of the AP, the AP applies different $MCS_n$ for individual wireless devices. This means that the AP determines an individual respective CCAT per wireless device by performing the method on a per wireless device basis.

The first node may also be a wireless device, which may move around wherein the channel towards the second node may change even if the second node is an AP. Of course, if the second node also is a wireless device, the channel towards the second node may also change. The wireless device may be communicating with more nodes, entities or devices in addition to the second node. Typically, these other nodes, entities or devices may be located in different physical locations as the second node, wherein a radio channel between the first node (wireless device) and any other node, entity or device is different from a radio channel between the first node (wireless device) and the second node. Thus, also when the first node is a wireless device, the first node performs the method individually for each possible node, entity or device that the first node is communicating with.

In an example, performing 210 the communication with the second node comprises receiving a transmission from the second node, the transmission comprising the $MCS_n$, or wherein performing 210 the communication with the second node comprises transmitting a transmission to the second node, the transmission comprising the $MCS_n$.

As described above, the transmission may be either uplink or downlink. Thus, the first node may either transmit to the second node, i.e. perform a transmission, or the first node may receive a transmission from the second node, i.e. perform a reception of a transmission.

Consequently, the first node may receive a transmission from the second node, the transmission comprising e.g. a preamble comprising the $MCS_n$, wherein a payload of the transmission is e.g. coded and modulated according to the $MCS_n$ in the preamble. Alternatively, the first node may transmit a transmission to the second node, wherein the transmission may comprise a preamble comprising the $MCS_n$, wherein a payload of the transmission is e.g. coded and modulated according to the $MCS_n$ in the preamble.

In yet an example, determining 220 the CCAT based on the $MCS_n$ and previously used MCSs comprises determining a new MCS, $MCS_w$, based on the used $MCS_n$, and optionally previously used MCSs, and determining the CCAT based on the new MCS, $MCS_w$.

As described above, the channel conditions and situations may change over time. The first node may e.g. be a wireless device moving around wherein its position relative the AP may have changed from a previous performed communication and the currently performed communication. The first node may be an AP wherein the second node is the wireless device, wherein the second node, i.e. the wireless device, may have changed its position relative the AP from a previous performed communication and the currently performed communication. Still further, other wireless devices in a proximity of the first and the second node may have changed their respective positions; and/or new wireless devices have come into the proximity of the first and the second node; and/or some wireless devices that were in the proximity of the first and the second node at the previous performed communication may have left the proximity of the first and the second node when the current communication is performed.

Consequently, the channel conditions and situations may have changed from one point in time to another. However, unless a plurality of the wireless devices travel at exceptionally high speeds, the channel conditions and situations may not vary too much such that previous used MCSs, unless very old, may still give a relatively good indication of the current channel conditions and situations. Thus, the first node may determine the CCAT to be used for a potential upcoming communication with the second node based on a new MCS, referred to as $MCS_w$, wherein the $MCS_w$ is based on, or a function of, the used $MCS_n$ and optionally previously used MCSs. Then the CCAT is determined as a function of the new MCS, $MCS_w$.

In an example, the method comprises separating between MCSs used for transmission, $MCS_t$, and MCSs used for reception, $MCS_r$, wherein determining the new MCS, $MCS_w$, is a function, f, of MCS(s) used for transmission, $MCS_t$, and MCS(s) used for reception, $MCS_r$, such that $MCS_w = f(MCS_t, MCS_r)$, wherein $MCS_t$ is either the last used MCS for transmission, $MCS_n$, or a combined value of previously used MCSs for transmissions and wherein $MCS_r$ is either the last used MCS, $MCS_n$, for reception or a combined value of previously used MCSs for receptions.

A channel, or link, may have similar conditions in both uplink and downlink. This is because the physical conditions, e.g. the path between the first and the second node, are similar in both directions. For example, if there is a clear path from the first node to the second node, there is a clear path from the second node to the first node, or if there is a building in the path from the first node to the second node, the same building is present in the path from the second node to the first node. Consequently, the channel conditions experienced by the first node may be similar to the channel conditions experienced by the second node.

From the first node's point of view, $MCS_r$, refers to MCSs related to reception of transmission. The $MCS_r$ may be the latest used MCS in a received transmission from the second node, which may further be the $MCS_n$ if the performed 210 communication was a reception of a transmission from the second node. The $MCS_r$ may be the last received transmission previous to the performed 210 communication, if the performed 210 communication was a transmission to the second node. Still further, the $MCS_r$ may be a combined value of previously used MCSs for receptions. In an example, the combined value may be an average of some, or all, of the previously received transmissions from the second node within a predefined time period.

Similarly, from the first node's point of view, $MCS_t$, refers to MCSs related to transmissions to the second node. The $MCS_t$ may be the latest used MCS in a transmission to the second node, which may further be the $MCS_n$ if the performed 210 communication was a transmission to the second node. The $MCS_t$ may be the last performed transmission previous to the performed 210 communication, if the performed 210 communication was a reception of a transmission from the second node. Still further, the $MCS_t$ may be a combined value of previously used MCSs for transmissions. In an example, the combined value may be an average of some, or all, of the previously performed transmissions to the second node within a predefined time period.

In still a further example, determining 220 the CCAT based on the $MCS_n$ and previously used MCSs comprises weighing the $MCS_n$ and previously used MCSs.

As described above, the channel conditions and situations may have changed somewhat from previous performed communications. Thus, newer MCSs may be weighed as being more important than old MCSs. Further, a single previously used MCS that deviates substantially from other previously used MCSs may be weighed with less importance. The weighing may be performed based on different factors, e.g. travelling speed of the node being the wireless device. If the wireless device is travelling at a speed above a speed threshold, then the most recently used MCSs may be weighed higher than other MCSs. If both nodes are stationary, the MCSs may be relatively constant, wherein a previously used MCSs that deviates substantially from the other may be weighed less as it may be an abnormality.

In still an example, the new MCS, $MCS_w$, is determined as $MCS_w = w_t * MCS_t + w_r * MCS_r$, wherein $w_t$ is a weight used for MCS(s) used for transmission and $w_r$ is a weight used for MCS(s) used for reception, where $w_t + w_r = 1$.

In this example, MCSs used for reception and MCSs used for transmission may be weighed differently in the case of $w_t \neq w_r$.

In yet an example, the CCAT, $CCAT_n$, is determined as a function, g, of previous CCAT(s), $CCAT_{PREV}$, a start value of the CCAT, $CCAT_0$, and the new MCS, $MCS_w$, $CCAT_n = g(CCAT_{PREV}, CCAT_0, MCS_w)$.

Depending on whether the performed communication 210 is the first communication with the second node or a subsequent communication, there may or may not be a previously used CCAT or MCS. In case the performed communication 210 is the first communication with the second node, a first CCAT value may be used, referred to as $CCAT_0$. In case the performed communication 210 is a subsequent communication with the second node, there may be a plurality of previously used CCATs which have been determined as described above.

Thus, when determining the new CCAT, $CCAT_n$, to be used in a potential upcoming transmission from the first node to the second node, the first node determines the $CCAT_n$ as a function based on at least some of the first CCAT value, previously used CCAT values and the new determined MCS to be used in a potential upcoming transmission from the first node to the second node. The previously used CCAT values, $CCAT_{PREV}$, may be the latest used CCAT value or any combination of previously used CCAT values.

In another example, the CCAT, $CCAT_n$, is determined as a function based on previous used MCSs, i.e. $CCAT_n = CCAT(MCS_{LOW}) + k * MCS_x$, where $MCS_x$, is any of the last received/transmitted MCS, i.e. $MCS_n$, or a combination of several previous received and/or transmitted MCSs, and $CCAT(MCS_{LOW})$ is a constant indicative of a CCAT for lowest possible MCS, and k is a parameter controlling the relation between MCS and CCAT, for positive values of k CCAT increases for increasing MCS, for negative values of k CCAT decreases for increasing MCS.

The MCSs may range from a lowest value to a highest value, wherein the lowest value may be used for very bad channel conditions and the highest value may be used for very good channel conditions.

Thus, the CCAT, i.e. the CCAT value to be used in a potential upcoming transmission from the first node to the second node may be determined as a function of, or associated with, the lowest MCS value plus a fraction or factor, k, of a MCS value, $MCS_x$, being any of the last received MCS, $MCS_n$, a combination of several previous received and/or transmitted MCSs. Two strategies may be possible here, either a more aggressive one with increased MCS or the opposite. These approaches have different sign of k, but also different $CCAT(MCS_{LOW})$, for the aggressive approach the $CCAT(MCS_{LOW})$ is very low, and k is positive, for the opposite strategy $CCAT(MCS_{LOW})$ is a very high threshold and k is negative.

In yet an example, the CCAT, $CCAT_n$, is determined as the lowest or highest possible CCAT value, plus the difference between the lowest possible CCAT value and the highest possible CCAT value multiplied by the ratio between MCS $MCS_x$, and a maximum MCS, $MCS_{max}$, i.e.

$$CCAT_n = CCAT_1 + (CCAT_2 - CCAT_1) * \frac{MCS_x}{MCS_{max}},$$

where MCS, $MCS_x$, is any of the last received MCS, $MCS_n$, a combination of several previous received and/or transmitted MCSs, and $CCAT_1$ is either the lowest or the highest possible CCAT value and $CCAT_2$ is either the highest or the lowest possible CCAT value, wherein $CCAT_2 \ne CCAT_1$.

If $CCAT_1$ is lowest possible CCAT value, then $CCAT_2$ is the highest possible CCAT value. Likewise, if $CCAT_2$ is lowest possible CCAT value, then $CCAT_1$ is the highest possible CCAT value. This means that the CCAT value, $CCAT_n$, to be used in a potential upcoming transmission from the first node to the second node may be determined as (1) the lowest possible CCAT value, plus the difference between the lowest possible CCAT value and the highest possible CCAT value multiplied by the ratio between MCS $MCS_x$, and a maximum MCS, $MCS_{max}$, or as (2) the highest possible CCAT value, plus the difference between the lowest possible CCAT value and the highest possible CCAT value multiplied by the ratio between MCS $MCS_x$, and a maximum MCS, $MCS_{max}$.

When $CCAT_2 > CCAT_1$, then the CCAT will be higher for higher MCSs, i.e. the method is more aggressive for higher MCSs. Likewise when $CCAT_2 < CCAT_1$, then the CCAT will be lower for lower MCSs, i.e. the method is less aggressive for lower MCSs. $CCAT_n$ may be determined as being at or between two end values. The same formula may be used in all cases, wherein $CCAT_1$ may be a lowest and $CCAT_2$ a highest CCAT value, or the other way around. In this manner, the values of the CCAT may go from low to high in the first case, and from high to low in the second case.

Figure 3:
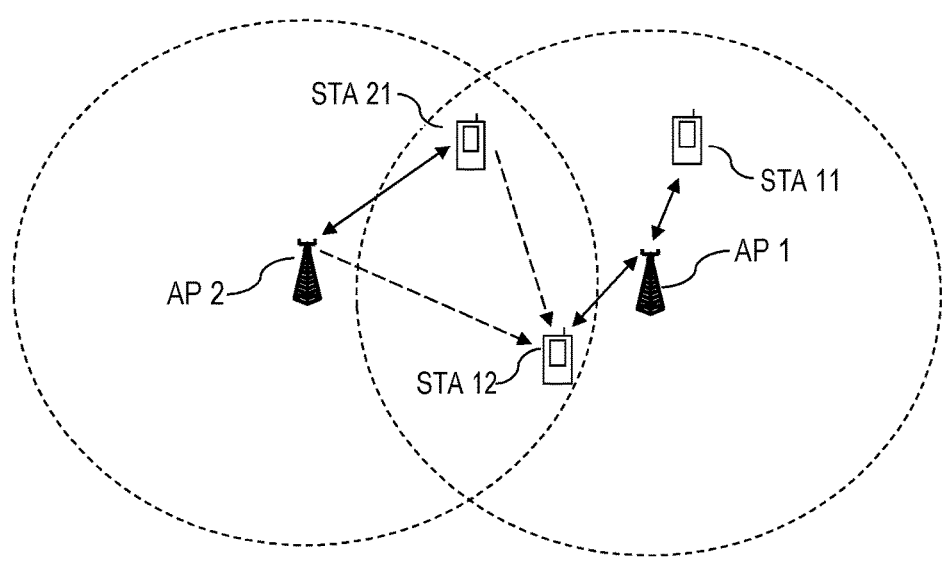
FIG. 3 is an illustration of neighbouring APs having overlapping coverage areas.

An AP generally has a coverage area, referred to as Basic Service Set. Two or more neighbouring APs may have overlapping BSS, also referred to as OBSS. An example is illustrated in FIG. 3. Here AP1 is serving STA11 and STA12, while AP2 is serving STA21. STA12 is interfered by AP2 and STA21, and therefore the AP1 is using a low MCS when transmitting to STA12. This indicates that STA12 may not be able to use a high CCA threshold and thereby ignoring ongoing transmissions between AP2 and STA21, since this may create interference from STA12 to an ongoing link between AP2 and STA21. However, STA11 is illustrated not being interfered by any neighbouring BSS's, so AP1 may use a high MCS for downlink transmissions to STA11. This indicates that STA11 may use a high CCAT, ignoring ongoing transmissions between e.g. STA21 and AP2, since it may cause very little interference to those transmissions, or be interfered by them.

When the first node is transmitting data to the second node, the MCS used for the transmission, here referred to as $MCS_n$, may as explained above be an indication of the link quality. If the link quality is high, there may be room for improving the channel access probability by increasing the CCAT, although this may degrade the link performance. Channel access time is however in most cases more valuable than link quality, according to the Shannon channel capacity formula.

The case may also be that the highest MCS is used, in which case it might be possible to tolerate additional interference without losing link quality at all. An example may be that the highest MCS has close to 100% success rate at SINR=30 dB, but the actual SINR is 40 dB. Then there is a margin of unused SINR, of 10 dB that may be used to gain in channel access time without any loss in the amount of data transmitted at each channel use. Thus, the higher the MCS for a transmission to or reception from the second node, the higher CCAT may be set for a potential upcoming transmission from the first node to the second node.

Likewise, the lower the MCS for a transmission to or reception from the second node, the lower the CCAT may be set for a potential upcoming transmission from the first node to the second node. But from a fairness perspective one may like to give more channel access to the users with poor MCS, and then the CCAT may be increased for low MCSs and not set to a low value.

Consequently, the function, f, for determining the CCAT for a potential upcoming transmission from the first node to the second node may be an increasing or decreasing function of a weighted sum of the last used MCSs with respect to $MCS_r$, and $MCS_t$. The function f may also include a filter in the time domain in order to achieve a smoother succession of CCAT values.

The MCS value may be comprised in the Very High Throughput, VHT, preamble, in bits 4-7 of VHT-Signal Field, VHT-SIG-A2, making it accessible both at the transmitter and receiver ends of the link, i.e. the first and the second node. Any node that can decode the PHY header may read the MCS index of the incoming packet, and any node that transmits may state the MCS index for the transmission in the PHY header. Thus, the $MCS_n$ may be known to both the first and the second node irrespective of which node is the transmitter and which node is the receiver. The MCS value may be comprised in the High Throughput, HT-SIG. This is relevant for the receiver as since the receiver may read the preamble and thereby determine the $MCS_n$. The transmitter knows the MCS value it inserts into the preamble before transmitting it.

Before any communication has been performed between the first and the second node, a respective start value of the CCAT and the MCS may be used in both the first and the second node.

In case the first node is an AP, the first node may have one CCAT for each wireless device it communicates with. In case the first node is a wireless device, it has one CCAT value for the AP it communicates with.

Embodiments herein also relate to a first node for determining a CCAT with regards to a second node. The first node and the second node are operable in a WLAN. The first node has the same objects, technical features and advantages as the method performed by the first node as described above. The first node will only be described in brief in order to avoid unnecessary repetition. The first node will be described with reference to FIGS. 4 and 5.

Figure 4:
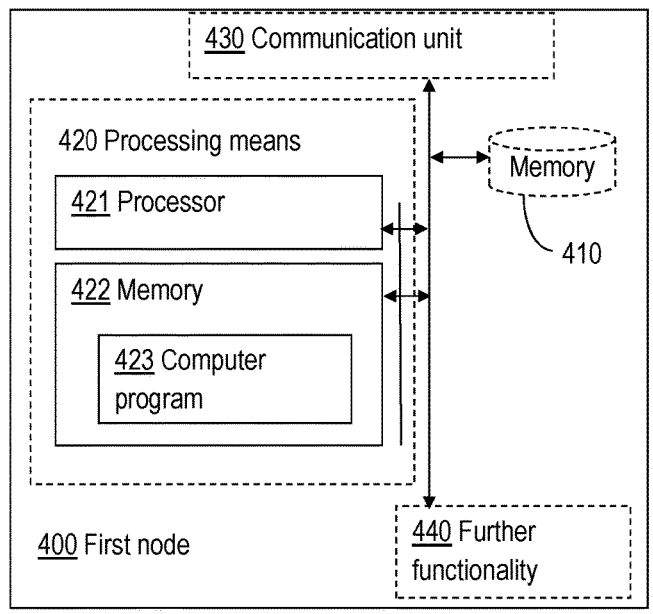
FIG. 4 is a block diagram of a first node configured for determining a CCAT with regards to a second node according to an exemplifying embodiment.

FIG. 4 is a block diagram of a first node configured for determining a CCAT with regards to a second node.

Figure 5:
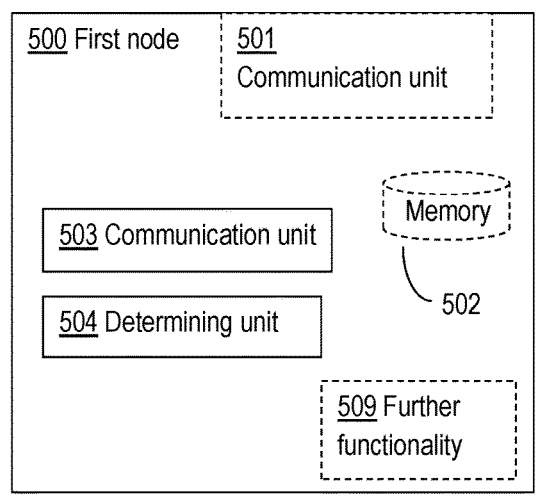
FIG. 5 is a block diagram of a first node configured for determining a CCAT with regards to a second node according to an exemplifying embodiment.

FIG. 5 is a block diagram of a first node configured for determining a CCAT with regards to a second node.

FIGS. 4 and 5 illustrate the first node being configured for performing a transmission to the second node using a MCS, $MCS_n$, and determining the CCAT as a function of the $MCS_n$ used for the transmission.

The first node may be realised on implemented in various ways. A first exemplifying realisation or implementation is illustrated in FIG. 4. FIG. 4 illustrates the first node comprising a processor 421 and memory 422, the memory comprising instructions, e.g. by means of a computer program 423, which when executed by the processor 421 causes the first node 400 to perform a transmission to the second node using a MCS, $MCS_n$, and to determine the CCAT based on the $MCS_n$ used for the transmission.

FIG. 4 also illustrates the first node 400 comprising a memory 410. It shall be pointed out that FIG. 4 is merely an exemplifying illustration and memory 410 may be optional, be a part of the memory 422 or be a further memory of the first node 400. The memory may for example comprise information relating to the first node 400, to statistics of operation of the first node 400, just to give a couple of illustrating examples. FIG. 4 further illustrates the first node 400 comprising processing means 420, which comprises the memory 422 and the processor 421. Still further, FIG. 4 illustrates the first node 400 comprising a communication unit 430. The communication unit 430 may comprise an interface through which the first node 400 communicates with other nodes or entities of the WLAN as well as other communication units. FIG. 4 also illustrates the first node 400 comprising further functionality 440. The further functionality 440 may comprise hardware of software necessary for the first node 400 to perform different tasks that are not disclosed herein.

An alternative exemplifying realisation, or implementation, of the first node is illustrated in FIG. 5. FIG. 5 illustrates the first node 500 comprising a communication unit 503 for performing a transmission to the second node using a MCS, $MCS_n$. FIG. 5 also illustrates the first node 500 comprising a determining unit 504 for determining the CCAT as a function of the $MCS_n$ used for the transmission.

In FIG. 5, the first node 500 is also illustrated comprising a communication unit 501. Through this unit, the first node 500 is adapted to communicate with other nodes and/or entities in the WLAN. The communication unit 501 may comprise more than one receiving arrangement. For example, the communication unit 501 may be connected to both a wire and an antenna, by means of which the first node 500 is enabled to communicate with other nodes and/or entities in the wireless communication network. Similarly, the communication unit 501 may comprise more than one transmitting arrangement, which in turn is connected to both a wire and an antenna, by means of which the first node 500 is enabled to communicate with other nodes and/or entities in the wireless communication network. The first node 500 further comprises a memory 502 for storing data. Further, the first node 500 may comprise a control or processing unit (not shown) which in turn is connected to the different units 503-504. It shall be pointed out that this is merely an illustrative example and the first node 500 may comprise more, less or other units or modules which execute the functions of the first node 500 in the same manner as the units illustrated in FIG. 5.

It should be noted that FIG. 5 merely illustrates various functional units in the first node 500 in a logical sense. The functions in practice may be implemented using any suitable software and hardware means/circuits etc. Thus, the embodiments are generally not limited to the shown structures of the first node 500 and the functional units. Hence, the previously described exemplary embodiments may be realised in many ways. For example, one embodiment includes a computer-readable medium having instructions stored thereon that are executable by the control or processing unit for executing the method steps in the first node 500. The instructions executable by the computing system and stored on the computer-readable medium perform the method steps of the first node 500 as set forth in the claims.

The first node has the same possible advantages as the method performed by the first node. One possible advantage is that air efficiency may be improved since the CCAT may be determined dynamically with respect to current channel conditions and situations. Another possible advantage is that user experience may be improved since the dynamically adjusted or determined CCAT may enable transmissions when the channel conditions and situations are favourable and hinder transmissions when the channel conditions and situations are unfavourable and thus preventing possible collisions and retransmissions.

According to an embodiment, the first node further is configured for determining the CCAT also based on the $MCS_n$ and previously used MCS(s) for transmissions from the first node to the second node.

According to an embodiment, the first node further is configured for determining the CCAT also based on the $MCS_n$ and previously used MCS(s) for reception(s) by the first node of transmission(s) from the second node.

According to an example, the first node is a wireless device and the second node is an AP; or wherein the first node is an AP and the second node is a wireless device.

According to an embodiment, the first node is configured for performing the communication with the second node by receiving a transmission from the second node, the transmission comprising the $MCS_n$, or by transmitting a transmission to the second node, the transmission comprising the $MCS_n$.

According to an embodiment, the first node is configured for determining the CCAT based on the $MCS_n$ and previously used MCSs by determining a new MCS, $MCS_w$, based on the used $MCS_n$ and previously used MCSs, and determining the CCAT based on the new MCS, $MCS_w$.

In an example, the first node is further configured for separating between MCSs used for transmission, $MCS_t$, and MCSs used for reception, $MCS_r$, wherein determining the new MCS, $MCS_w$, is a function, f, of MCS(s) used for transmission, $MCS_t$, and MCS(s) used for reception, $MCS_r$, such that $MCS_w = f(MCS_t, MCS_r)$, wherein $MCS_t$ is either the last used MCS for transmission, $MCS_n$, or a combined value of previously used MCSs for transmissions and wherein $MCS_r$ is either the last used MCS, $MCS_n$, for reception or a combined value of previously used MCSs for receptions.

The first node may further be configured for determining the CCAT based on the $MCS_n$ and previously used MCSs by weighing the $MCS_n$ and previously used MCSs.

The first node may further be configured for determining the new MCS, $MCS_w$, as $MCS_w = w_t \ast MCS_t + w_r \ast MCS_r$, wherein $w_t$ is a weight used for MCS(s) used for transmission and $w_r$ is a weight used for MCS(s) used for reception, wherein $w_t + w_r = 1$.

Still further, the first node may be configured for determining the CCAT, $CCAT_n$, as a function, g, of previous CCAT(s), $CCAT_{PREV}$, a start value of the CCAT, $CCAT_0$, and the new MCS, $MCS_w$, $CCAT_n = g(CCAT_{PREV}, CCAT_0, MCS_w)$.

Still further, the first node may be configured for determining the CCAT, $CCAT_n$, as a function based on previous used MCSs, i.e. $CCAT_n=CCAT(MCS_{LOW})+k*MCS_x$, where MCS, $MCS_x$, is any of the last received MCS, $MCS_n$, a combination of several previous received and/or transmitted MCSs, and $CCAT(MCS_{LOW})$ is a constant indicative of a CCAT for lowest possible MCS, and k is a parameter controlling the relation between MCS and CCAT, for positive values of k CCAT increases for increasing MCS, for negative values of k CCAT decreases for increasing MCS.

The first node may further be configured for determining the CCAT, $CCAT_n$, as the lowest or highest possible CCAT value, plus the difference between the lowest possible CCAT value and the highest possible CCAT value multiplied by the ratio between MCS $MCS_x$, and a maximum MCS, $MCS_{max}$, i.e.

$$CCAT_n = CCAT_1 + (CCAT_2 - CCAT_1) * \frac{MCS_x}{MCS_{max}},$$

where MCS, $MCS_x$, is any of the last received MCS, $MCS_n$, a combination of several previous received and/or transmitted MCSs, and $CCAT_1$ is either the lowest or the highest possible CCAT value and $CCAT_2$ is either the highest or the lowest possible CCAT value, wherein $CCAT_2 \neq CCAT_1$.

Figure 6:
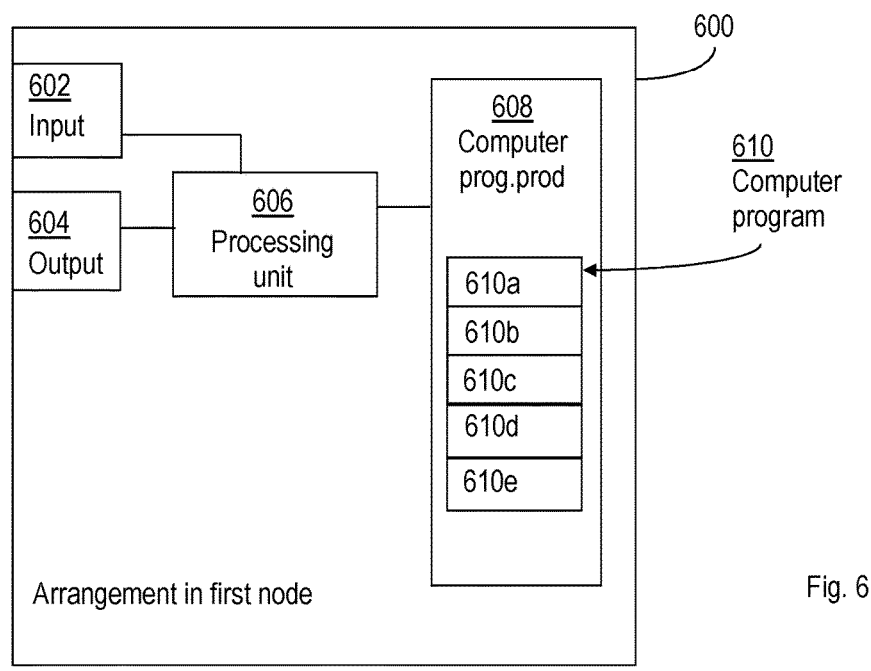
FIG. 6 is a block diagram of an arrangement in a first node configured for determining a CCAT with regards to a second node according to an exemplifying embodiment.

FIG. 6 schematically shows an embodiment of an arrangement 600 in a first node 500. Comprised in the arrangement 600 in the first node 500 are here a processing unit 606, e.g. with a Digital Signal Processor, DSP. The processing unit 606 may be a single unit or a plurality of units to perform different actions of procedures described herein. The first node may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces 501.

Furthermore, the arrangement in the first node comprises at least one computer program product 608 in the form of a non-volatile memory, e.g. an Electrically Erasable Programmable Read-Only Memory, EEPROM, a flash memory and a hard drive. The computer program product 608 comprises a computer program 610, which comprises code means, which when executed in the processing unit 606 in the arrangement in the first node causes the first node to perform the actions e.g. of the procedure described earlier in conjunction with FIG. 2.

The computer program 610 may be configured as a computer program code structured in computer program modules 610a-610e. Hence, in an exemplifying embodiment, the code means in the computer program of the first node comprises a communication unit, or module, for performing a transmission to the second node using a Modulation and Coding Scheme, MCS, $MCS_n$. The computer program further comprises a determining unit, or module, for determining the CCAT based on the $MCS_n$ used for the transmission.

The computer program modules could essentially perform the actions of the flow illustrated in FIG. 2, to emulate the first node 500. In other words, when the different computer program modules are executed in the processing unit 606, they may correspond to the units 503-504 of FIG. 5.

Although the code means in the embodiments disclosed above in conjunction with FIG. 5 are implemented as computer program modules which when executed in the processing unit causes the first node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the first node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical and/or physical entities or a combination thereof.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a first node, operable in a Wireless Local Network, WLAN, the method being for determining a Clear Channel Assessment Threshold, CCAT, with regards to a second node operable in the WLAN, the method comprising:
    performing a transmission to the second node using a Modulation and Coding Scheme, MCS, $MCS_n$, and
    determining the CCAT based on an MCS index of the $MCS_n$ used for the transmission,
    wherein the MCS index of the $MCS_n$ used for the transmission provides an indication of the interference caused by transmission from the first node.

2. The method according to claim 1, wherein determining the CCAT is further based on a MCS previously used for transmitting from the first node to the second node.

3. The method according to claim 1, wherein determining the CCAT is further based on a MCS previously used for receiving by the first node of a transmission from the second node.

4. The method according to claim 1, wherein the first node is a wireless device and the second node is an Access Point, AP; or wherein the first node is an AP and the second node is a wireless device; or wherein both the first and the second node are wireless devices which may communicate with each other without involving an AP.

5. The method according to claim 1, wherein performing the communication with the second node comprises receiving a transmission from the second node, the transmission comprising the $MCS_n$, or wherein performing the communication with the second node comprises transmitting a transmission to the second node, the transmission comprising the $MCS_n$.

6. The method according to claim 1, wherein determining the CCAT based on the MCS index of the $MCS_n$ comprises determining the CCAT based on previously used MCSs and determining a new MCS, $MCS_w$, based on the used $MCS_n$ and optionally previously used MCSs, and determining the CCAT based on the new MCS, $MCS_w$.

7. The method according to claim 6, further comprising separating between MCSs used for transmission, $MCS_t$, and MCSs used for reception, $MCS_r$, wherein determining the new MCS, $MCS_w$, is a function, f, of MCS(s) used for transmission, $MCS_t$, and MCS(s) used for reception, $MCS_r$, such that $MCS_w=f(MCS_t, MCS_r)$, wherein $MCS_t$ is either the last used MCS for transmission, $MCS_n$, or a combined value of previously used MCSs for transmissions and wherein $MCS_r$ is either the last used MCS, $MCS_n$, for reception or a combined value of previously used MCSs for receptions.

8. The method according to claim 7, wherein the CCAT, $CCAT_n$, is determined as a function, g, of previous CCAT(s), $CCAT_{prev}$, a start value of the CCAT, $CCAT_0$, and the new MCS, $MCS_w$, such that $CCAT_n=g(CCAT_{prev}, CCAT_0, MCS_w)$.

9. The method according to claim 1, wherein determining the CCAT based on the MCS index of the $MCS_n$ comprises determining the CCAT based on previously used MCSs and weighing the $MCS_n$ and previously used MCSs.

10. The method according to claim 9, wherein the new MCS, $MCS_w$, is determined as $MCS_w=w_t*MCS_t+w_r*MCS_r$, wherein $w_t$ is a weight used for MCS(s) used for transmission and $w_r$ is a weight used for MCS(s) used for reception, where $w_t+w_r=1$.

11. The method according to claim 1, wherein the CCAT, $CCAT_n$, is determined as a function based on previous used MCSs, i.e. $CCAT_n=CCAT(MCS_{Low})+k*MCS_x$, where $MCS_x$, is any of the last received or transmitted MCS, $MCS_n$, or a combination of several previous received and/or transmitted MCSs, and $CCAT(MCS_{Low})$ is a constant indicative of a CCAT for lowest possible MCS, and k is a parameter controlling the relation between MCS and CCAT, for positive values of k CCAT increases for increasing MCS, for negative values of k CCAT decreases for increasing MCS.

12. The method according to claim 1, wherein the CCAT, $CCAT_n$, is determined as the lowest or highest possible CCAT value, plus the difference between the lowest possible CCAT value and the highest possible CCAT value multiplied by the ratio between MCS $MCS_x$, and a maximum MCS, $MCS_{max}$, i.e.

$$CCAT_n = CCAT_1 + (CCAT_2 - CCAT_1) * \frac{MCS_x}{MCS_{max}},$$

where MCS, $MCS_x$, is any of the last received MCS, $MCS_n$, a combination of several previous received and/or transmitted MCSs, and $CCAT_1$ is either the lowest or the highest possible CCAT value and $CCAT_2$ is either the highest or the lowest possible CCAT value, wherein $CCAT_2 \neq CCAT_1$.

13. A first node operable in a Wireless Local Network, WLAN, for determining a Clear Channel Assessment Threshold, CCAT, with regards to a second node operable in the WLAN, the first node being configured for:

performing a transmission to the second node using a Modulation and Coding Scheme, MCS, $MCS_n$, and determining the CCAT based on an MCS index of the $MCS_n$ used for the transmission, wherein the MCS index of the $MCS_n$ used for the transmission provides an indication of the interference caused by transmission from the first node.

14. The first node according to claim 13, further being configured for determining the CCAT also based on a previously used MCS for transmitting from the first node to the second node.

15. The first node according to claim 13, further being configured for determining the CCAT also based on a previously used MCS for receiving by the first node a transmission from the second node.

16. The first node according to claim 13, wherein the first node is a wireless device and the second node is an Access Point, AP; or wherein the first node is an AP and the second node is a wireless device; or wherein both the first and the second node are wireless devices which may communicate with each other without involving an AP.

17. The first node according to claim 13, further being configured for performing the communication with the second node by receiving a transmission from the second node, the transmission comprising the $MCS_n$, or by transmitting a transmission to the second node, the transmission comprising the $MCS_n$.

18. The first node according to claim 13, further being configured for determining the CCAT based on the $MCS_n$ and previously used MCSs by determining a new MCS, $MCS_w$, based on the used $MCS_n$ and optionally previously used MCSs, and determining the CCAT based on the new MCS, $MCS_w$.

19. The first node according to claim 13, further being configured for separating between MCSs used for transmission, $MCS_t$, and MCSs used for reception, $MCS_r$, wherein determining the new MCS, $MCS_w$, is a function, f, of MCS(s) used for transmission, $MCS_t$, and MCS(s) used for reception, $MCS_r$, such that $MCS_w=f(MCS_t, MCS_r)$, wherein $MCS_t$ is either the last used MCS for transmission, $MCS_n$, or a combined value of previously used MCSs for transmissions and wherein $MCS_r$ is either the last used MCS, $MCS_n$, for reception or a combined value of previously used MCSs or receptions.

20. The first node according to claim 19, further being configured for determining the CCAT, $CCAT_n$, as a function, g, of previous CCAT(s), $CCAT_{prev}$, a start value of the CCAT, $CCAT_0$, and the new MCS, $MCS_w$, such that $CCAT_n=g(CCAT_{prev}, CCAT_0, MCS_w)$.

21. The first node according to claim 13, further being configured for determining the CCAT based on the $MCS_n$ and previously used MCSs by also weighing the $MCS_n$ and previously used MCSs.

22. The first node according to claim 21, further being configured for determining the new MCS, $MCS_w$, as $MCS_w=w_t*MCS_t+w_r*MCS_r$, wherein $w_t$ is a weight used for MCS(s) used for transmission and $w_r$ is a weight used for MCS(s) used for reception, wherein $w_t+w_r=1$.

23. The first node according to claim 13, further being configured for determining the CCAT, $CCAT_n$, as a function based on previous used MCSs, i.e. $CCAT_n=CCAT(MCS_{Low})+k*MCS_x$, where $MCS_x$, is any of the last received or transmitted MCS, $MCS_n$, or a combination of several previous received and/or transmitted MCSs, and $CCAT(MCS_{Low})$ is a constant indicative of a CCAT for lowest possible MCS, and k is a parameter controlling the relation between MCS and CCAT, for positive values of k CCAT increases for increasing MCS, for negative values of k CCAT decreases for increasing MCS.

24. The first node according to claim 13, further being configured for determining the CCAT, $CCAT_n$, as the lowest or highest possible CCAT value, plus the difference between the lowest possible CCAT value and the highest possible CCAT value multiplied by the ratio between MCS $MCS_x$, and a maximum MCS, $MCS_{max}$, i.e.

$$CCAT_n = CCAT_1 + (CCAT_2 - CCAT_1) * \frac{MCS_x}{MCS_{max}},$$

where MCS, $MCS_x$, is any of the last received MCS, $MCS_n$, a combination of several previous received and/or transmitted MCSs, and $CCAT_1$ is either the lowest or the highest possible CCAT value and $CCAT_2$ is either the highest or the lowest possible CCAT value, wherein $CCAT_2 \neq CCAT_1$.

* * * * *